W. HOFFMIRE.
Improvement in Coal-Scuttles.

No. 130,498.　　　　　　　　　　　Patented Aug. 13, 1872.

Witnesses:
Ernst Bilhuber.
C. Wahlers.

Inventor:
William Hoffmire

UNITED STATES PATENT OFFICE.

WILLIAM HOFFMIRE, OF NEW YORK, N. Y.

IMPROVEMENT IN COAL-SCUTTLES.

Specification forming part of Letters Patent No. 130,498, dated August 13, 1872.

*To all whom it may concern:*

Be it known that I, WILLIAM HOFFMIRE, of the city, county, and State of New York, have invented a new and useful Improvement in Coal-Hods; and I do hereby declare the following to be a full, clear, and exact description thereof, which will enable those skilled in the art to make and use the same, reference being had to the accompanying drawing forming part of this specification, in which drawing—

Figure 1:
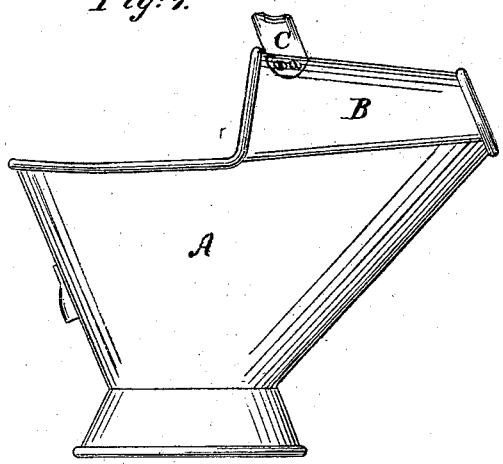
Figure 2:
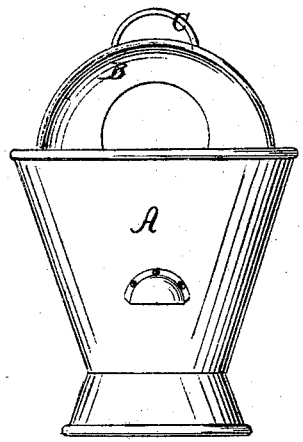

Figure 1 represents a side view of my coal-hod. Fig. 2 is a rear view of the same.

Similar letters indicate corresponding parts.

This improvement consists in the arrangement of a fixed handle attached to a bonnet, which extends across the top of the hod either in front or in the rear in such a manner that the handle is always in position to be grasped with the hand, and that by means of said handle the operation of introducing coal into a stove is facilitated; and, furthermore, the cost of the hod is reduced.

In the drawing, the letter A designates a coal-hod, which is provided with a bonnet, B, extending over the spout or front end of the hod; but my improvement is also applicable to coal-hods having a bonnet extending over their rear portion. On the top of this bonnet is firmly secured a handle, C.

This handle supersedes the bail which is generally used for carrying and handling a coal-hod; and it has the following decided advantages over such bails: First, my handle is less expensive than the bail, since the two ears alone, which form the bearings for the bail and which have to be secured to the body of the hod each by two rivets, cost full as much as my whole handle. Second, my handle allows of handling the hod with more ease than the ordinary bail, since it is rigidly attached to the hod and does not project up any higher than absolutely necessary for the admission of the hand. Third, my handle is always in position to be grasped by the hand, whereas the bail turns down in front or rear and has to be turned up in the proper position before it serves as a handle.

What I claim as new, and desire to secure by Letters Patent, is—

The arrangement of a fixed handle on the bonnet B of a coal-hod, as shown and described.

Witnesses:           WM. HOFFMIRE.
  W. HAUFF,
  JAMES EDGAR.